US012637580B2

(12) United States Patent
    Guedon et al.

(10) Patent No.: US 12,637,580 B2
(45) Date of Patent: May 26, 2026

(54) MINERAL INK FOR INKJET PRINTING ON A MINERAL SUBSTRATE

(71) Applicant: EUROKERA S.N.C., Chateau-Thierry (FR)

(72) Inventors: Thibault Guedon, Paris (FR); Emmanuel Lecomte, Nesles la Montagne (FR); Charlène Seme, Nogentel (FR); Pablo Vilato, Paris (FR)

(73) Assignee: EUROKERA S.N.C., Chateau-Thierry (FR)

( * ) Notice: Subject to any disclaimer, the term of this patent is extended or adjusted under 35 U.S.C. 154(b) by 1270 days.

(21) Appl. No.: 17/050,726

(22) PCT Filed: May 14, 2019

(86) PCT No.: PCT/EP2019/062357
    § 371 (c)(1),
    (2) Date: Oct. 26, 2020

(87) PCT Pub. No.: WO2019/219691
    PCT Pub. Date: Nov. 21, 2019

(65) Prior Publication Data
    US 2021/0115281 A1      Apr. 22, 2021

(30) Foreign Application Priority Data

May 15, 2018    (FR) ...................................... 1870565

(51) Int. Cl.
    *C09D 11/38*      (2014.01)
    *B41M 5/00*       (2006.01)
    *C03C 3/064*      (2006.01)
    *C03C 3/087*      (2006.01)
    *C03C 3/093*      (2006.01)
    *C03C 8/02*       (2006.01)
    *C03C 8/16*       (2006.01)
    *C03C 8/20*       (2006.01)
    *C03C 10/00*      (2006.01)
    *C03C 17/04*      (2006.01)
    *C09D 11/033*     (2014.01)
    *C09D 11/322*     (2014.01)

(52) U.S. Cl.
    CPC ............. *C09D 11/38* (2013.01); *B41M 5/007* (2013.01); *C03C 3/064* (2013.01); *C03C 3/087* (2013.01); *C03C 3/093* (2013.01); *C03C 8/02* (2013.01); *C03C 8/16* (2013.01); *C03C 8/20* (2013.01); *C03C 10/0027* (2013.01); *C03C*

*17/04* (2013.01); *C09D 11/033* (2013.01); *C09D 11/322* (2013.01); *C03C 2217/29* (2013.01); *C03C 2217/485* (2013.01); *C03C 2217/72* (2013.01); *C03C 2218/119* (2013.01)

(58) Field of Classification Search
    CPC ................................ C03C 3/087; C03C 3/064
    See application file for complete search history.

(56) References Cited

U.S. PATENT DOCUMENTS 5,326,728 A * 7/1994 Boury ..................... C03C 3/089
                                                              501/67
2016/0244356 A1* 8/2016 Lecomte ................... C03C 8/14

FOREIGN PATENT DOCUMENTS

EP          3793958 B1 *  1/2025  ........... C09D 11/322
ES          3018294 T3 *  5/2025  ........... C09D 11/322
FR       2 858 974 A1     2/2005
JP          7410878 B2 *  1/2024  ............. C03C 3/062
KR       102798989 B1 *  4/2025  ........... C09D 11/322
WO    WO 2015/055953 A1   4/2015
WO    WO-2016110724 A1 *  7/2016  ........... C03C 17/007

OTHER PUBLICATIONS

"Pine oil" by Wikipedia, the free encyclopedia [retrieved on May 15, 2024]. Retrieved from the internet <URL: https://en.wikipedia.org/w/index.php?title=Pine_oil&oldid=1177768649>, revision dated Sep. 29, 2023 (Year: 2023).*
International Search Report as issued in International Patent Application No. PCT/EP2019/062357, dated Jun. 19, 2019.

* cited by examiner

*Primary Examiner* — Sophie Hon

*Assistant Examiner* — Sow-Fun Hon

(74) *Attorney, Agent, or Firm* — CUSHMAN PARTNERS, LLC

(57) ABSTRACT

A mineral ink for inkjet printing on a mineral substrate, includes a glass frit, an organic solvent, a dispersant, a surfactant and a glass fit including the following constituents in the weight limits defined below expressed as percentages by weight of the glass frit: 35 to 50% of $SiO_2$, 15 to 25% of $Al_2O_3$, 1.5 to 4% of $Li_2O$, 22 to 32% of $B_2O_3$, 0 to 2% of $Na_2O$, 2 to 5% of $K_2O$, 1 to 5% of $CaO$, 1 to 4% of $ZrO_2$.

15 Claims, No Drawings

MINERAL INK FOR INKJET PRINTING ON A MINERAL SUBSTRATE

CROSS-REFERENCE TO RELATED APPLICATIONS

This application is the U.S. National Stage of PCT/EP2019/062357, filed May 14, 2019, which in turn claims priority to French patent application number 1870565 filed May 15, 2018. The content of these applications are incorporated herein by reference in their entireties.

The present invention relates to a mineral ink for inkjet printing on a mineral substrate. It also relates to a process for manufacturing an enameled glass-ceramic plate using such a mineral ink.

The need to produce complex enameled decorations on mineral substrates, such as glasses or glass-ceramics, produced in small amounts, requires novel enameling processes that are more adaptable than those currently based on screen printing methods. Contactless digital printing techniques meet this need. They can be adapted to the geometric constraints of the products and also to any type of decorative pattern with smaller technical difficulties.

Unlike screen printing methods, they do not require the design and manufacture of a screen specific to each decorative pattern and adapted to the shape of the substrate on which the enamel must be deposited. They make it possible to more rapidly enamel surfaces of large size and/or of variable size with decorations that may be different, for example in the case of enameling a kitchen worktop. They offer an extended gamut of colors that can be reproduced with the aid of a reduced set of primary colors, in particular by a four-color process. They therefore simplify the deposition of multicolor decorative enamels for which screen printing methods require different screens. They may further be interfaced with digital image processing devices in order to personalize the decorations on demand with the aid of a digital image used as a template.

Among contactless digital printing methods, inkjet printing methods are particularly suitable for enameling complex decorations on any type of glass or glass-ceramic support. Inkjet printing methods have two main technical variants:

- a synchronous technical variant, referred to as "continuous jet", based on the emission of a continuous jet of drops of ink toward the substrate;
- an asynchronous technical variant, referred to as "drop-on-demand", based on the emission of drops strictly necessary for the printing of the pattern.

In the "continuous jet" variant, the drops of ink are generated by fragmentation of a jet coming from a pressurized orifice. The size of the drops is dependent mainly on the diameter of the orifice and on the velocity of the jet. Once formed, the drops are electrically charged by induction using an electrode, then deflected in a given direction with the aid of an electric field created between deflection plates placed at the nozzle outlet.

In the "drop-on-demand" variant, the existing pressure in the reservoir in which the ink is stored is insufficient to thereby overcome the surface tension. The ink then forms a convex or concave meniscus at the orifice of the reservoir. The ink may be extracted from the reservoir either by electrostatic extraction or by mechanical extraction. In the case of electrostatic extraction, an electrostatic field is applied between the orifice of the reservoir and the nozzle so as to deform the convex surface of the meniscus. When the electrostatic force outweighs the capillary force, one or more drops are ejected from the orifice, the size and number of which depend on the intensity of the electrostatic field applied. In the case of mechanical extraction, the pressure in the ink reservoir is below the atmospheric pressure. The meniscus that the ink forms at the orifice is concave. A rapid variation in the volume of the reservoir, for example under the effect of the displacement, with the aid of a piezoelectric element, of a membrane constituting a wall of the reservoir, gives rise to the expulsion of a drop of ink.

The mineral pastes produced for screen printing methods cannot generally be directly used in inkjet printing methods. Generally based on resins, in particular acrylic resins, and/or fatty substances, such as vegetable oils, they are too viscous and their surface tensions are too high. They are not suitable for inkjet printing, in particular for "drop-on-demand" inkjet printing. Conversely, mineral inks are generally not very suitable for screen printing methods.

The deposition of enamel by inkjet printing on the surface of glass or glass-ceramic products requires that the enamel be prepared in the form of a colloidal suspension or dispersion of a finely divided mineral solid phase in a generally organic liquid phase. This mineral ink must have a density, viscosity and a surface tension that are compatible with inkjet printing methods. The values of these parameters depend on the printing devices used and determine the quality of the decorative patterns obtained.

The mineral solid phase of the colloidal suspension generally comprises a glass frit and optionally a mineral pigment. The size of the grains constituting the mineral solid phase is generally micrometric, or even sub-micrometric. The liquid phase predominantly comprises a solvent, generally an organic solvent. The type and the amount of solvent determining part the rheological properties, the surface tension and the drying behavior of the mineral ink. It is also possible to add a dispersant to prevent the flocculation and/or sedimentation of the solid phase, and also a surfactant in order to adjust the surface tension of the mineral ink.

After deposition on a mineral substrate, the mineral ink is dried then subjected to a firing heat treatment. The drying of the ink may be carried out at ambient temperature. The drying time depends on the amount of ink deposited.

Industrial production lines may sometimes comprise drying devices in order to reduce the drying time and increase the production rates of the enameled parts. For an inkjet printing device comprising 1000 printing nozzles, convection drying devices are generally suitable. On the other hand, when the number of printing nozzles is higher, for example 2000 printing nozzles, recourse may be made to electromagnetic radiation drying devices, for instance the infrared radiation dryer, the drying temperatures of which are generally between 100° C. and 150° C.

In order to be durable, an enamel must in particular adhere to the substrate on which it is deposited and withstand the mechanical and chemical stresses that it may be subjected to under the conditions of use of said substrate.

However, it has been observed that the current mineral inks deposited by inkjet printing on mineral substrates, such as plates made of ceramic, of glass or of glass-ceramic, used as work or cooking surfaces in or in the vicinity of cooking devices, do not make it possible to obtain enamels that are resistant to food products and to detergents. The combined effects of repeated exposures to these products and of heating cycles give rise to the degradation thereof in the medium or long term. Moreover, these mineral inks do not withstand the high temperatures that the mineral substrates on which they are deposited may be subjected to during their manufacture. In particular, they do not withstand temperatures above 800° C. In addition to a poor adhesion to the substrates, these enamels have the same disadvantages as those described above.

The present invention solves these problems. It relates to a mineral ink for inkjet printing on a mineral substrate comprising:

a glass frit, an organic solvent, a dispersant, and a surfactant, characterized in that the glass frit comprises the following constituents in the weight limits defined below expressed as percentages by weight of the glass frit:

35 to 50% of $SiO_2$, 15 to 25% of $Al_2O_3$, 1.5 to 4% of $Li_2O$, 22 to 32% of $B_2O_3$, 0 to 2% of $Na_2O$, 2 to 5% of $K_2O$, 1 to 5% of $CaO$, 1 to 4% of $ZrO_2$.

The mineral ink according to the invention is suitable for deposition by inkjet printing methods on mineral substrates made of glass, ceramic and glass-ceramic.

One advantage of the mineral ink according to the invention is that it makes it possible to create sets of primary colors enabling extended gamuts of colors to be achieved when they are used in inkjet printing devices. Each primary colour may then be formulated with the aid of the mineral ink according to the invention by selecting a suitable mineral pigment. The production of the gamut may then be carried out, for example and nonlimitingly, by a four-color process according to the model of four primary colors CMYB (Cyan, Magenta, Yellow, Black) or else by a set of five primary colors according to the model of five primary colors CMYBW (Cyan, Magenta, Yellow, Black, White). The mineral ink according to the invention is particularly suitable for models of primary colours that make it possible to obtain various levels of gray.

The mineral ink according to the invention has other advantages linked to the synergy between its mineral phase and its organic phase.

When the mineral ink according to the invention is used in inkjet printing methods, it advantageously makes it possible to produce enamel patterns with particularly fine graphic elements compared to those which may be obtained using ink from the prior art. For example, the mineral ink according to the invention makes it possible to create homogeneous lines having a width of the order of 0.05 mm or homogeneous dots having a diameter of the order of 0.05 mm. The thickness of the enamel obtained may reach an order of 1 μm.

In inkjet printing methods, the printing nozzles may emit unwanted drops, of which the size of these drops depends on the composition of the mineral ink used. If these drops are too large, secondary "bonds" or "bridges" are created between the graphic elements of the printed pattern, deteriorate the esthetics thereof and give rise, in the substrate used for the deposition, to local microcracking phenomena which reduce the durability of the enamel and of the substrate in use. With the mineral inks from the prior art, the size of the unwanted drops may be very large and give rise the formation of secondary enamel bonds of several tens of micrometer. Another advantage of the ink according to the invention is that it limits the formation of unwanted drops, and thus makes it possible to obtain patterns of great sharpness and to limit the local microcracking phenomena.

The proportions by weight of the organic solvent, of the dispersant, of the surfactant and of the glass frit are adjusted so that the properties of the mineral ink are suitable for the device used for the inkjet printing.

In particular, the surface tension is preferably between 20 and 50 $mN·m^{-1}$, preferably between 25 and 32 $mN·m^{-1}$ at 25° C.

The mineral ink has shear-thinning properties, also referred to as shear rate thinning properties, i.e. the viscosity reduces with the shear rate. The viscosity is between 20 and 100 mPa·s, preferably between 20 and 30 mPa·s at 25° C.

The weight fraction of the glass frit in the mineral ink is advantageously between 50 and 65%. The organic solvent preferably represents 80% by weight of the mixture of organic solvent, dispersant and surfactant of the mineral ink. The type and the amount of organic solvent may be adjusted according to the technical constraints of the inkjet printing device used and the production constraints.

The enamels that may be obtained after drying and firing of a mineral ink according to the invention are particularly resistant to soiling and to mechanical stresses such as metallic friction. In order to form an enamel using the mineral ink according to the invention, the temperature at which the mineral ink is dried is preferably between 25 and 150° C. The temperature of the firing heat treatment is preferably equal to or above 650° C. Preferably, the temperature will not exceed 1100° C. Above that, the adhesion of the enamel to the mineral substrate risks not being optimal. In particular, it may become less resistant to mechanical stresses such as abrasion or friction.

According to one particular embodiment of the mineral ink according to the invention, the organic solvent advantageously represents between 70 and 90% by weight of the sum of the percentages by weight of the organic solvent, dispersant and surfactant. Such an amount of solvent is suitable for most inkjet printing devices.

The organic solvent may be an organic compound that is liquid at ambient temperature or a mixture of organic compounds that are liquid at ambient temperature comprising at least one alcohol functional group.

The choice of the organic compound comprising an alcohol functional group depends on the method and/or device used for the inkjet printing. If the deposition of the mineral ink on the mineral substrate is slow, it is advantageous to use a solvent or a solvent mixture with a low saturation vapor pressure under the operating pressure and temperature conditions of the method and/or device. In other words, under the standard temperature and pressure conditions, in order to prevent the solvent or mixture of solvents from evaporating too rapidly, the boiling point thereof may be higher. Nonlimiting examples of organic solvent are: methylene glycol, ethylene glycol, propylene glycol, butylene glycol, methanol, ethanol, propanol, butanol, glycol ethers such as propylene glycol methyl ether or dipropylene glycol methyl ether.

The dispersant is, preferably, a copolymer or a mixture of copolymers comprising at least one acid functional group. The dispersant makes it possible to prevent the flocculation and/or sedimentation of the solid phase. It preferably represents 3 to 7%, at most 10%, by weight of the sum of the percentages by weight of the organic solvent, dispersant and surfactant. The alkylammonium salts of a copolymer comprising one or more acid functional groups are nonlimiting examples of dispersant.

The surfactant is preferably a polyether or mixture of polyethers. It preferably represents 0.05% to 0.5% by weight of the sum of the percentages by weight of the organic solvent, dispersant and surfactant.

The mineral ink according to the invention may be used without addition of colorant mineral pigment. The color of the enamel that may be obtained using the mineral ink of the invention when it does not comprise colorant mineral pigment depends on the color of the mineral substrate on which it is deposited. By way of example, on a dark glass-ceramic plate, of black or brown color, for an enamel with a final thickness of around 2.8 μm, the color parameters, expressed in the CIE 1976 L*a*b* color space, may be L*=27.22, a*=0.65, b*=−0.88 with a D65 illuminant and an observation angle of 10°.

In one embodiment of the invention, the mineral ink may in addition comprise a mineral pigment in order to give a tint or a color to the enamel. The mineral pigment makes it possible to adjust the color of the mineral ink and of the enamel. The mineral pigment may be based on metal oxides and/or metals or metal alloys that may oxidize during the heat treatment of the mineral ink to form the enamel. Nonlimiting examples of mineral pigments are titanium oxide, cerium oxide, cobalt oxide, iron oxide, zirconium oxide, manganese oxide, spinels, or else doped aluminas.

The sum of the percentages by weight of the glass frit and of the mineral pigment advantageously represents 50 to 80% by weight of the mineral ink. Above around 80%, the solid fraction in the mineral ink may become too large and be a source of technical difficulties for a use of the mineral ink by inkjet printing. Below around 50%, there is a risk that the solid fraction is too dispersed over the substrate after deposition by inkjet printing and that the enamel obtained is not uniformly distributed over the substrate. The color of the enamel obtained risks not being uniform.

Preferably, the percentage by weight of the glass frit represents 65% to 90% by weight of the sum of the percentages by weight of the glass frit and of the mineral pigment. It has been observed experimentally that this value range is an optimal range for obtaining a homogeneous enamel with a satisfactory color. A percentage by weight of glass frit of less than 65% may lead to a poor adhesion of the enamel on the substrate. The limits indicated are indicative. They depend in particular on the intensity or the saturation of the coloration provided by the mineral pigment and on the esthetic effects desired for the enamel.

In one particular embodiment, the D90 of the particle size distribution of the mixture of the glass frit and of the mineral pigment is between 1 μm and 2 μm. The D90 is calculated from the particle size distribution determined by laser particle size analysis methods according to the standard ISO 13320:2009. It corresponds to the size of the particles that represent 90% of the total volume of particles of the mixture. In other words, 90% of the volume of particles of the mixture of the glass frit and of the mineral pigment consists of particles having a size of between 1 μm and 2 μm.

The mineral inks for inkjet printing on a mineral substrate may contain a binder or a mixture of organic and/or inorganic binder that may be used for maintaining the structure and the shape of the depositions on the mineral substrate until the formation of the enamel after firing. Examples of binders are organic sol-gel type binders or acrylic resins.

In one particular embodiment of the invention, the mineral ink does not comprise such an organic and/or inorganic binder. Specifically, although it is not ruled out that it may contain it, the mineral ink of the invention does not require such an organic and/or inorganic binder to form an enamel having precise contours and free of deformation.

The invention also relates to a method for manufacturing a mineral ink.

The method comprises the following steps:

a. providing a glass frit which comprises the following constituents in the weight limits defined below expressed as percentages by weight of the glass frit:
   35 to 50% of $SiO_2$,
   15 to 25% of $Al_2O_3$,
   1.5 to 4% of $Li_2O$,
   22 to 32% of $B_2O_3$,
   0 to 2% of $Na_2O$,
   2 to 5% of $K_2O$,
   1 to 5% of CaO,
   1 to 4% of $ZrO_2$;

b. mixing the glass frit with a mineral pigment;

c. adding an organic solvent and a dispersant to the mixture obtained in step (b);

d. recirculation milling of the mixture obtained in step (c) until the D90 of the particle size distribution of the mixture of the glass frit and the mineral pigment is between 1 and 2 μm;

e. adding a surfactant to the milled preparation obtained in step (d).

The glass frit provided in step (a) is generally obtained according to glass product manufacturing methods known from the prior art. In particular, it may be obtained by water quenching of a liquid silicate having the desired composition. This liquid silicate is generally formed by the high-temperature melting of a mixture of glass batch materials. The batch materials of the mixture bear the elements that are incorporated into the composition of the glass frit. They are in proportions such that once the mixture is melted, the molten silicate has the composition desired for the glass frit.

The mineral ink according to the invention is particularly suitable for the deposition of decorative enamels on a glass-ceramic plate. A glass-ceramic is a composite material comprising an amorphous phase in which crystalline phases or crystals are dispersed. It is generally obtained by the heat treatment of a glass, referred to as "parent glass", in order to crystallize, in a controlled manner, crystals in the volume thereof. This treatment via which a glass partially crystallizes is referred to as "ceramization treatment" or simply "ceramization". The final physicochemical properties of the glass-ceramic depend on the composition of the parent glass and on the ceramization treatment.

The mineral ink of the invention may be deposited by inkjet printing directly on a plate of glass-ceramic parent glass before the ceramization treatment. It is not necessary for a process for manufacturing a glass-ceramic plate using the mineral ink according to the invention to comprise a step of heat treatment suitable for the formation of an enamel from the mineral ink. In this sense, the invention also relates to a process for manufacturing an enameled glass-ceramic plate comprising the following steps:

a. providing a plate of glass-ceramic parent glass;

b. depositing a green enamel on the surface of the plate of parent glass via a method of inkjet printing of a mineral ink according to any one of the embodiments described above;

c. heat treating the plate of glass-ceramic parent glass comprising the green enamel according to the following ceramization cycle:

i. a nucleation hold between 650° C. and 860° C., for 15 minutes to 4 hours, ii. a crystalline growth hold between 860° C. and 1100° C., for 10 minutes to 2 hours.

The mineral ink of the invention may also be deposited by inkjet printing directly on a glass-ceramic plate before being dried then fired at a temperature of around 850° C. for 30 minutes. In this embodiment, the exposure of the dried mineral ink to temperatures lower than those of the process described above may give the enamel certain particular properties, in particular, those relating to the color.

In one embodiment of the process for manufacturing an enameled glass-ceramic plate using a mineral ink according to the invention, the inkjet printing method is a drop-on-demand type inkjet printing method. In particular, the mineral ink is suitable for an inkjet printing method of drop-on-demand type by mechanical extraction. Preferably, the mechanical extraction is carried out using a piezoelectric element which, under the effect of an electrical pulse, displaces a membrane constituting a wall of the reservoir in which the ink is stored.

By way of nonlimiting example, the plate of glass-ceramic parent glass of the process for manufacturing an enameled glass-ceramic plate is formed from a lithium aluminosilicate glass comprising the following constituents in the weight limits defined below expressed as percentages by weight of the glass:

| | |
|---|---|
| $SiO_2$ | 52-75%, |
| $Al_2O_3$ | 12-27%, |
| $Li_2O$ | 1.5-5.5%, |
| $Na_2O$ | 0-3%, |
| $K_2O$ | 0-3%, |
| CaO | 0-5%, |
| MgO | 0-5%, |
| SrO | 0-5%, |
| BaO | 0-5%, |
| ZnO | 0-5%, |
| $TiO_2$ | 1-6%, |
| $ZrO_2$ | 0-3%, |
| $P_2O_5$ | 0-8%. |

Another subject of the invention is an enameled glass-ceramic plate that may be obtained using a manufacturing process according to any one of the embodiments described above. Such an enameled plate may advantageously be used as a cooking surface of a cooking device. Specifically, the enamels formed on its surface from a mineral ink according to the invention are particularly suitable for this type of application. They have a high resistance to metal friction, in particular to metal friction linked to the movements of pans, and also an advantageous chemical and mechanical durability for repeated exposures to food products and to heating cycles. In this sense, the invention also relates to a cooking device comprising an enameled glass-ceramic plate obtained by a process for manufacturing an enameled glass-ceramic plate according to one of the embodiments described above.

The features and advantages of the invention are illustrated by the examples described below.

The nature and the proportions of the constituents of an example E1 of mineral ink according to the invention are indicated in table 1 below. The proportions of the constituents are expressed as percentages by weight of the mineral ink.

TABLE 1

| Constituent | Composition | Quantity (wt %) |
|---|---|---|
| Glass frit | Frit 1 | 46.8 |
| Pigment | Titanium dioxide ($TiO_2$) | 18.2 |
| Solvent | 1-methoxy-2-propanol | 30.6 |

TABLE 1-continued

| Constituent | Composition | Quantity (wt %) |
|---|---|---|
| Dispersant | Alkylolammonium salt of a copolymer comprising acid groups | 4.0 |
| Surfactant | Polydimethylsiloxane | 0.4 |

The solid fraction of the mineral ink represents 65% of the weight of mineral ink. The liquid fraction represents 35% of the weight of mineral ink.

The nature and the proportions of the constituents of the glass frit Frit 1 are indicated in table 2 below. The proportions are expressed as percentages by weight of the glass frit.

TABLE 2

| Constituent | Quantity (wt %) |
|---|---|
| $SiO_2$ | 42.90 |
| $Al_2O_3$ | 18.50 |
| $Li_2O$ | 2.10 |
| $B_2O_3$ | 27.00 |
| $Na_2O$ | 0.90 |
| $K_2O$ | 3.40 |
| CaO | 2.70 |
| $ZrO_2$ | 2.50 |

The mineral ink of example E1 was manufactured according to the following protocol:

a. providing a glass frit Frit 1, obtained by quenching a mixture of vitrifiable liquid silicate;

b. mixing the glass frit with the mineral pigment;

c. adding the organic solvent and the dispersant to the mixture obtained in step (b);

d. wet recirculation milling of the mixture obtained in step (c) until the D90 of the particle size distribution of the mixture of the glass frit and the mineral pigment is between 1 and 2 μm;

e. adding the surfactant to the milled preparation obtained in step (d).

The physicochemical and rheological properties of the mineral ink of example E1 are indicated in table 3 below.

The surface tension was measured using a Kibron EZPi tensiometer according to the Wilhelmy and Du Noüy-Padday methods. The viscosity was measured according to the Brookfield method for two shear rates, 50 s$^{-1}$ and 100 s$^{-1}$. The D90 is calculated from the particle size distribution determined by laser particle size analysis methods according to the standard ISO 13320:2009.

TABLE 3

| Surface tension | D90 solid-phase | Viscosity (mPa · s) | |
|---|---|---|---|
| (mN · m$^{-1}$) at 22° C. | particle size (μm) | Shear 50 s$^{-1}$ | Shear 100 s$^{-1}$ |
| 25.5 | 1.1 | 27.4 | 26.3 |

For comparison purposes, two mineral inks A and B according to the prior art were reproduced. The nature and the proportions of the constituents of the glass frits used for these two inks A and B are indicated in table 4 below. The proportions are expressed as percentages by weight of the glass frit.

TABLE 4

| | Quantity (wt %) | |
|---|---|---|
| Constituent | A | B |
| SiO$_2$ | 33.7 | 16.5 |
| Al$_2$O$_3$ | 2.9 | 2.2 |
| Bi$_2$O$_3$ | 56.6 | 80.2 |
| Na$_2$O | 3.3 | 0.4 |
| ZnO | 1.2 | 0.0 |
| CaO | 0.8 | 0.2 |
| TiO$_2$ | 1.6 | 0.4 |

Three enameled glass-ceramic plates were manufactured using mineral inks E1, A and B respectively according to a process comprising the following steps:

a. providing a plate of glass-ceramic parent glass;

b. depositing a green enamel on the surface of the plate of parent glass via a technique of dropwise inkjet printing of the mineral ink;

c. drying an enamel at ambient temperature or with the aid of an infrared radiation drying device;

d. heat treating the plate of glass-ceramic parent glass comprising the green enamel according to the following ceramization cycle:

i. a crystalline nucleation hold between 650° C. and 860° C., for 15 minutes to 4 hours, ii. a crystalline growth hold between 860° C. and 1100° C., for 10 minutes to 2 hours.

The mineral inks were printed so as to form textures of random sinuous protrusions. The thicknesses randomly vary between 2 μm and 3 μm and the widths vary randomly between 0.2 mm and 1 mm. The protrusions may be in the form of dots, lines and/or curves.

The soiling resistance of the plates and also their cleanability were evaluated using protocols that stimulate real conditions of use of an enameled plate as cooking surface in a cooking device or as work surface.

The soiling resistance was evaluated using the following protocol. An enameled glass-ceramic plate is firstly inserted on a cooking device in which it serves as cooking surface. A mixture of ground meat, egg, milk, sugar, flour, Gruyere cheese and tomato purée is placed between a pan containing 100 ml of water and the enameled zone of the glass-ceramic plate. The mixture is in contact with the enameled zone. The mixture is then heated until the water has evaporated from the pan, then for a further 10 minutes so that it begins to carbonize and to adhere to the glass-ceramic plate. The steps of applying the mixture and heating are repeated five times. The degree of soiling is evaluated visually according to the following scale of grades:

0: no stain;

1: little stain;

2: stain with pronounced contrast;

3: stain with very pronounced contrast.

This degree of soiling may also be expressed using the following overall index:

$$I_g = \frac{\sum_i^3 (i^2 Z_i)/100}{3^2} \qquad \text{[Math. 1]}$$

where i is the degree of soiling and Zi the amount of surface, expressed as a percentage, of which the degree of soiling is i. The lower the degree of soiling, Ig, the greater the resistance of the enamel to soiling. Conversely, the higher the degree of soiling, Ig, the lower the resistance of the enamel to soiling.

The cleanability of the enamels was evaluated after cleaning with a scraper and using a detergent specially designed for cleaning cooking plates and available commercially, according to the following scale of levels:

A: easy cleaning;

B: more difficult cleaning;

C: difficult cleaning.

The results of the evaluation tests are grouped in the table below.

TABLE 5

| | Soiling & cleaning | | |
|---|---|---|---|
| Mineral ink | Degree of soiling | Ig | Cleaning levels |
| E1 | 1 | <0.1 | B |
| A | 3 | 1 | C |
| B | 3 | 1 | C |

The results in the table show that the enamel obtained using the mineral ink according to the invention is more resistant to soiling than the enamels obtained using mineral inks according to the prior art. The enamel obtained using the mineral ink E1 according to the invention stains little. Its level of soiling, Ig, is less than 0.1. Little of the surface of the enamel is covered with soiling. On the other hand, the enamels obtained using the mineral inks A and B according to the prior art have a much higher level of soiling. A large portion of the surfaces of these enamels is covered with significant soiling.

The enamel obtained using the mineral ink E1 according to the invention is also easier to clean than the enamels obtained using the mineral inks A and B.

A counterexample, CEx1, of an enameled glass-ceramic plate comprising an enamel deposited by screen printing was also manufactured in order to compare the resistances to metal friction of an enamel that may be obtained using a mineral ink according to the invention and an enamel obtained by screen printing.

Firstly, a mineral paste for screen printing comprising an enamel powder and a medium based on pine oil was prepared. The enamel powder is composed of around 70% by weight of a glass frit of the same composition as that used for the mineral ink of the invention, and of around 30% by weight of a black mineral pigment based on a mixture of oxides of iron, chromium, nickel, silicon and cobalt. The D90 of the particle size distribution of the enamel powder is between 1 μm and 2 μm.

The mineral paste was then deposited on a glass-ceramic parent glass using standard screen printing methods. Next, the assembly was subjected to a heat treatment according to the following cycle:

i. a crystalline nucleation hold between 650° C. and 860° C., for 15 minutes to 4 hours, ii. a crystalline growth hold between 860° C. and 1100° C., for 10 minutes to 2 hours.

Another example E2 of an enameled glass-ceramic plate comprising an enamel obtained using the mineral ink of the invention was also produced according to the same method as that used for example E1. A mineral ink identical to that of example E1 was used except for the mineral pigment, which was replaced by the same mineral pigment as that of the enamel paste of the counterexample CEx1.

The resistance to metal friction of the enamels was evaluated for the two glass-ceramic plates of examples E2 and CEx1 according to the following protocol. Firstly, the surface of the enameled zone of the glass-ceramic plate is rubbed successively with a back-and-forth movement using several metal elements such as coins and metal and/or enamel pans. The surface is then cleaned using various detergent products specially designed for cleaning cooking plates and available commercially. The degradation of the enameled surface is evaluated visually on a scale of 0 to 20; the degree 0 corresponds to complete degradation of the enameled surface and the degree 20 corresponds to a complete absence of degradation. In other words, the higher the degree, the more resistant the enamel to metal friction.

The results of the evaluation tests are grouped in table 6 below. They show that the same enamel obtained using a mineral ink according to the invention E2 is more resistant to metal friction than when it is obtained using a screen printing method.

TABLE 6

| Mineral ink | Metal friction |
| --- | --- |
| E2 | 15 |
| CEx1 | 12.5 |

These results clearly show that the mineral ink according to the invention makes it possible to form enamels having a resistance to metal friction and to soiling and also a cleanability that are superior to those of the enamels obtained from mineral inks or enamel pastes for screen printing from the prior art.

The effects of the attainable size of the graphic elements of the patterns on the local microcracking phenomena of the enamel obtained and of the substrate were evaluated for the mineral ink according to the invention. Table 7 groups the results obtained for three enameled plates, one with the mineral ink according to the invention, the other two with a mineral ink from the prior art. These two plates were manufactured according to the same protocol as that used for the preceding comparative tests. The enamel pattern is a printed image consisting of marbling covering the whole of the surface of the plates.

The thicknesses of the pattern are the minimum thicknesses attainable by each of the mineral inks.

The local microcracking phenomena were evaluated by a measurement of the breaking strength (MOR) at the levels of the enamel patterns according to a three-point bending method with the enameled face of the plate in extension. Between 10 and 20 samples were measured for each of the plates.

TABLE 7

| Ink | Thickness (μm) | MOR (MPa) | MOR standard deviation |
| --- | --- | --- | --- |
| E1 | 1.0 | 79 | 9 |
| A | 4.0 | 59 | 19 |
| B | 4.0 | 47 | 12 |

The value of the MOR obtained with the mineral ink according to the invention is significantly higher than that obtained with the inks from the prior art. It also has a lower standard deviation, which means that the value of the MOR is more homogeneous throughout the whole of the pattern.

The results show that, by virtue of the mineral ink according to the invention, it is possible to obtain graphic elements of great sharpness unlike an ink from the prior art.

This great sharpness contributes to better esthetics of the decoration and a limitation of the local microcracking phenomena, thus contributing to greater durability and greater soiling resistance of the enamel.

The invention claimed is:

1. A mineral ink comprising:
    a glass frit,
    an organic solvent,
    a dispersant, and
    a surfactant,
    wherein the glass frit comprises the following constituents in the weight limits defined below expressed as percentages by weight of the glass frit:
    35 to 50% of $SiO_2$,
    15 to 25% of $Al_2O_3$,
    1.5 to 4% of $Li_2O$,
    24 to 32% of $B_2O_3$,
    0 to 2% of $Na_2O$,
    2 to 5% of $K_2O$,
    1 to 5% of CaO,
    1 to 4% of $ZrO_2$,
    wherein the mineral ink has a viscosity and particle size distribution suitable for inkjet printing on a mineral substrate, and
    wherein the mineral ink has a viscosity between 22 and 100 mPa·s at 25° C.

2. The mineral ink as claimed in claim 1, further comprising a mineral pigment.

3. The mineral ink as claimed in claim 2, wherein the sum of the percentages by weight of the glass frit and of the mineral pigment represents 50 to 80% by weight of the mineral ink.

4. The mineral ink as claimed in claim 2, wherein the percentage by weight of the glass frit represents 65% to 90% by weight of the sum of the weight percentages of the glass frit and of the mineral pigment.

5. The mineral ink as claimed in claim 1, wherein the organic solvent represents 70 to 90% by weight of the sum of the percentages by weight of the organic solvent, the dispersant and the surfactant.

6. The mineral ink as claimed in claim 1, wherein the organic solvent is an organic compound that is liquid at ambient temperature or a mixture of organic compounds that are liquid at ambient temperature comprising at least one alcohol functional group.

7. The mineral ink as claimed in claim 1, wherein the dispersant is a copolymer or a mixture of copolymers comprising at least one acid functional group.

8. The mineral ink as claimed in claim 1, wherein the surfactant is a polyether, or a polyether-modified polysiloxanes or a mixture of polyethers.

9. The mineral ink as claimed in claim 1, wherein the D90 of a particle size distribution of the mixture of the glass frit and the mineral pigment is between 1 μm and 2 μm.

10. A method for manufacturing a mineral ink comprising the following steps:
    a. providing a glass frit which comprises the following constituents in the weight limits defined below expressed as percentages by weight of the glass frit:
    35 to 50% of $SiO_2$,
    15 to 25% of $Al_2O_3$,
    1.5 to 4% of $Li_2O$,
    24 to 32% of $B_2O_3$,
    0 to 2% of $Na_2O$,
    2 to 5% of $K_2O$,
    1 to 5% of CaO,
    1 to 4% of $ZrO_2$;

b. mixing the glass frit with a mineral pigment;

c. adding an organic solvent and a dispersant to the mixture obtained in step (b);

d. recirculation milling of the mixture obtained in step (c) until the D90 of the particle size distribution of the mixture of the glass frit and the mineral pigment is between 1 and 2 µm;

e. adding a surfactant to the milled preparation obtained in step (d), wherein the mineral ink has a viscosity and particle size distribution suitable for inkjet printing on a mineral substrate, and wherein the mineral ink has a viscosity between 22 and 100 mPa·s at 25° C.

11. A process for manufacturing an enameled glass-ceramic plate comprising the following steps:

a. providing a plate of glass-ceramic parent glass;

b. depositing a green enamel on the surface of the plate of parent glass via a method of inkjet printing of the mineral ink as claimed in claim 1;

c. heat treating the plate of glass-ceramic parent glass comprising the green enamel according to the following ceramization cycle:

i. a nucleation hold between 650° C. and 860° C., for 15 minutes to 4 hours, ii. a growth hold between 860° C. and 1100° C., for 10 minutes to 2 hours.

12. The process for manufacturing an enameled glass-ceramic plate as claimed in claim 11, wherein the inkjet printing method is a drop-on-demand type inkjet printing method.

13. The process for manufacturing an enameled glass-ceramic plate as claimed in claim 11, wherein the plate of glass-ceramic parent glass is formed by a lithium alumino-silicate glass comprising the following constituents in the weight limits defined below expressed as percentages by weight of the glass:

| | |
|---|---|
| $SiO_2$ | 52-75%, |
| $Al_2O_3$ | 12-27%, |
| $Li_2O$ | 1.5-5.5%, |
| $Na_2O$ | 0-3%, |
| $K_2O$ | 0-3%, |
| CaO | 0-5%, |
| MgO | 0-5%, |
| SrO | 0-5%, |
| BaO | 0-5%, |
| ZnO | 0-5%, |
| $TiO_2$ | 1-6%, |
| $ZrO_2$ | 0-3%, |
| $P_2O_5$ | 0-8%. |

14. An enameled glass-ceramic plate obtained using the process as claimed in claim 11.

15. A cooking device comprising the enameled glass-ceramic plate as claimed in claim 14.

* * * * *